US010851647B2

(12) United States Patent
Wang et al.

(10) Patent No.: US 10,851,647 B2
(45) Date of Patent: Dec. 1, 2020

(54) DOWNHOLE VIBRATION AND IMPACT DATA RECORDING METHOD

(71) Applicant: INSTITUTE OF GEOLOGY AND GEOPHYSICS CHINESE ACADEMY OF SCIENCES, Beijing (CN)

(72) Inventors: Zhongxing Wang, Beijing (CN); Yongyou Yang, Beijing (CN); Qingyun Di, Beijing (CN); Zili Wang, Beijing (CN); Wenxuan Chen, Beijing (CN); Tianxin Zhang, Beijing (CN); Linfeng Hong, Beijing (CN); Qijun Xie, Beijing (CN)

(73) Assignee: INSTITUTE OF GEOLOGY AND GEOPHYSICS CHINESE ACADEMY OF SCIENCES (IGGCAS), Beijing (CN)

( * ) Notice: Subject to any disclaimer, the term of this patent is extended or adjusted under 35 U.S.C. 154(b) by 33 days.

(21) Appl. No.: 16/170,988

(22) Filed: Oct. 25, 2018

(65) Prior Publication Data
US 2020/0018156 A1 Jan. 16, 2020

(51) Int. Cl.
E21B 47/12 (2012.01)
E21B 47/26 (2012.01)
G01L 5/00 (2006.01)

(52) U.S. Cl.
CPC ............ E21B 47/26 (2020.05); G01L 5/0052 (2013.01)

(58) Field of Classification Search
CPC .................... E21B 47/124; G01L 5/0052
See application file for complete search history.

(56) References Cited

U.S. PATENT DOCUMENTS

| 4,161,782 A | 7/1979 | McCracken |
| 4,903,245 A | 2/1990 | Close et al. |

(Continued)

FOREIGN PATENT DOCUMENTS

| CN | 108844622 A | 11/2018 |
| WO | 0109576 A1 | 2/2001 |
| WO | 2009097449 A1 | 8/2009 |

OTHER PUBLICATIONS

Australian office action dated Jan. 8, 2019 for the corresponding Australian patent application.

Primary Examiner — Yoshihisa Ishizuka
(74) Attorney, Agent, or Firm — Platinum Intellectual Property LLP

(57) ABSTRACT

Disclosed is a downhole vibration and impact data recording method, comprising: performing analog-to-digital conversion on analog data, outputting digital format data obtained at a sampling rate $f_1$, and performing sampling storage processing and analysis storage processing on the same. The sampling storage processing includes outputting the digital format data obtained at a sampling rate fn through multiple samplings; storing the same continuously into a storage module. The analysis storage processing includes: buffering the digital format data obtained at the sampling rate $f_1$ into a memory; analyzing the same to determine whether an impact event occurs, and if yes, storing the current data in the memory into the storage module, and then jumping back to the buffering step; otherwise, jumping directly back to the buffering step. With the above method, the amount of data storage can be effectively reduced, while the characteristics of the vibration and impact data can be analyzed.

10 Claims, 2 Drawing Sheets

(56) References Cited

U.S. PATENT DOCUMENTS

| | | | |
|---|---|---|---|
| 6,199,016 B1* | 3/2001 | Zuykov | G01V 1/003 |
| | | | 367/70 |
| 7,492,821 B2 | 2/2009 | Berman et al. | |
| 2008/0035333 A1* | 2/2008 | Newman | E21B 41/00 |
| | | | 166/250.01 |
| 2009/0266609 A1* | 10/2009 | Hall | E21B 47/00 |
| | | | 175/45 |
| 2011/0153603 A1 | 6/2011 | Adiba et al. | |
| 2012/0169923 A1 | 7/2012 | Millar et al. | |
| 2015/0034306 A1* | 2/2015 | Hull | E21B 47/04 |
| | | | 166/250.01 |
| 2015/0109140 A1 | 4/2015 | Probel et al. | |
| 2018/0284754 A1* | 10/2018 | Cella | G05B 19/41865 |

* cited by examiner

DOWNHOLE VIBRATION AND IMPACT DATA RECORDING METHOD

CROSS REFERENCE TO RELATED APPLICATIONS

This application claims a priority of Chinese Patent Application No. 201810755478.3, filed Jul. 11, 2018, the disclosure of which is hereby incorporated by reference in its entirety.

TECHNICAL FIELD

The disclosure relates to the technical field of petroleum exploration, in particular to a downhole vibration and impact data recording method.

BACKGROUND OF THE INVENTION

Drilling operations are the most common work in the field of petroleum exploration and production. An efficient, stable and low-cost drilling is the foundation for the petroleum industry. When pipeline drilling and engineering geological drilling operations are performed, vibration and impact data of drilling tools are very important parameters, which usually need to be measured and recorded in real time. By analyzing the vibration data of the drilling tools, it is possible to effectively protect certain instruments in equipment. For example, if it is detected that a vibration is above a certain magnitude, certain functional units may be automatically shut down, thereby being capable of avoiding damage due to excessive vibration. At the same time, by recording vibration parameters, it is also possible to learn whether a damage of an instrument is caused due to excessive vibrations. Further, the analysis of vibration characteristics and impact characteristics of the drilling tools under different layers of formation can also be used as a reference for subsequent development and design of instruments with high vibration and impact tolerance.

In the prior art, the vibration and impact data during a drilling process are recorded mainly in the following manner.

For the impact data, a downhole data acquisition and recording unit does not record an original data, but only records analysis results after real-time analysis and processing, such as the magnitude and number of large impacts. This recording method requires less storage space. However, since the original data is not recorded, the impact characteristics of the downhole drilling cannot be analyzed due to unavailable original data, thereby no reference for subsequent design is provided.

For the vibration data, the downhole data acquisition and recording unit records an original data, and continuously stores the original data at a fixed frequency, so that the magnitude and the number of large vibrations can be obtained, and the original data is also available for subsequent analysis. Typically, an instrument can run for up to 200 hours in a single operation. If the data is continuously recorded and stored on a storage all the way, the amount of data may be very large, and the requirement for the capacity of the storage may be very high. There are fewer models of storages which can be adaptable for long-term and high temperature (150° C. or even up to 175° C.) downhole operation, and such storages are usually bulky and have a small capacity, being difficult to meet the requirement for recording the entire operation throughout the whole process and the dimension requirement for installation.

SUMMARY OF THE INVENTION

In view of the above, embodiments of the disclosure provide a downhole vibration and impact data recording method which can effectively solve the problem concerning high requirement for a storage device in the prior art. According to an embodiment, a vibration and impact data recording method is provided which may comprise: step S1, performing an analog-to-digital conversion on analog data output from a sensor at a sampling rate f1, outputting digital format data obtained at the sampling rate f1, and performing a sampling storage processing and an analysis storage processing on the digital format data obtained at the sampling rate f1. The sampling storage processing may comprise: step S2, sampling the digital format data obtained at the sampling rate f1 and outputting the digital format data obtained at a sampling rate f2; step S3, sampling the digital format data obtained at the sampling rate f2 and outputting the digital format data obtained at a sampling rate f3; and repeating a step of the sampling and outputting the digital format data obtained at a sampling rate fn; step S4, storing the digital format data obtained at the sampling rate fn continuously into a storage module; step S5, storing the digital format data obtained at the sampling rates f1 to fn−1 intermittently, wherein a storage time length for the digital format data obtained at the sampling rate f1 is t1, the storage time length for the digital format data obtained at the sampling rate f2 is t2, and the storage time length for the digital format data obtained at the sampling rate fn−1 is tn−1, and t1<t2<tn−1. The analysis storage processing may comprise: step S6, buffering the digital format data obtained at the sampling rate f1 into a memory; step S7, analyzing the digital format data obtained at the sampling rate f1 currently buffered in the memory to obtain a current condition of an impact; step S8, analyzing the condition of an impact to determine whether an impact event occurs; if the impact event occurs, performing step S9; if no impact event occurs, directly returning to step S6; and step S9, storing the data currently in the memory into the storage module, and then returning to step S4.

In some embodiments, a step may be further comprised of reading the data using a special data reading program after a data storage is completed.

In some embodiments, the analog-to-digital conversion may be implemented by a 24-bit high speed analog-to-digital converter.

In some embodiments, f1=10 KHz and f2=1 KHz.

In some embodiments, a step of performing an anti-aliasing filtering on the digital format data obtained at the sampling rate f1 may be further comprised before sampling the digital format data having obtained at the sampling rate f1.

In some embodiments, the anti-aliasing filtering may have a cutoff frequency of 0.5*f2.

In some embodiments, the condition of an impact may include a magnitude of the impact and a duration during which the impact occurs.

In some embodiments, to determine whether an impact event occurs may be to determine whether the magnitude of the impact is greater than a threshold A.

In some embodiments, the data may be buffered in a first-in first-out mode.

In some embodiments, the storage module may be a high-temperature and large-capacity flash memory.

Compared with a format of conventional continuous storage, the downhole vibration and impact data recording method according to the embodiments of the disclosure may generate data streams at two kinds of sampling rates, and use different storage strategies for the data streams at different sampling rates, i.e., the data obtained at a relatively low sampling rate may be continuously stored, and the data obtained at a relatively high sampling rate may be first buffered, and when an impact occurs, the data for a period of time before and after the impact may be stored, so that the amount of data storage can be effectively reduced, and the characteristics of the vibration and impact data, especially the spectrum characteristics thereof, can be analyzed. While the original data information is fully retained, the requirements for the storage devices are greatly reduced. The downhole vibration and impact data recording method according to the embodiments of the disclosure is especially applicable for very deep underlying-layer drilling operations involving high underground environment temperature and pressure and requiring extremely high performance of equipment, which is in line with the demand for deep formation exploration.

BRIEF DESCRIPTION OF THE DRAWINGS

In order to more clearly illustrate technical solutions according to embodiments of the present disclosure, the drawings used in the description of the embodiments will be briefly described below. It is obvious that the drawings in the following description are merely some embodiments of the disclosure. Other drawings may also be obtained by those skilled in the art in view of the disclosed drawings without creative labor.

DETAILED DESCRIPTION OF THE INVENTION

Figure 1:
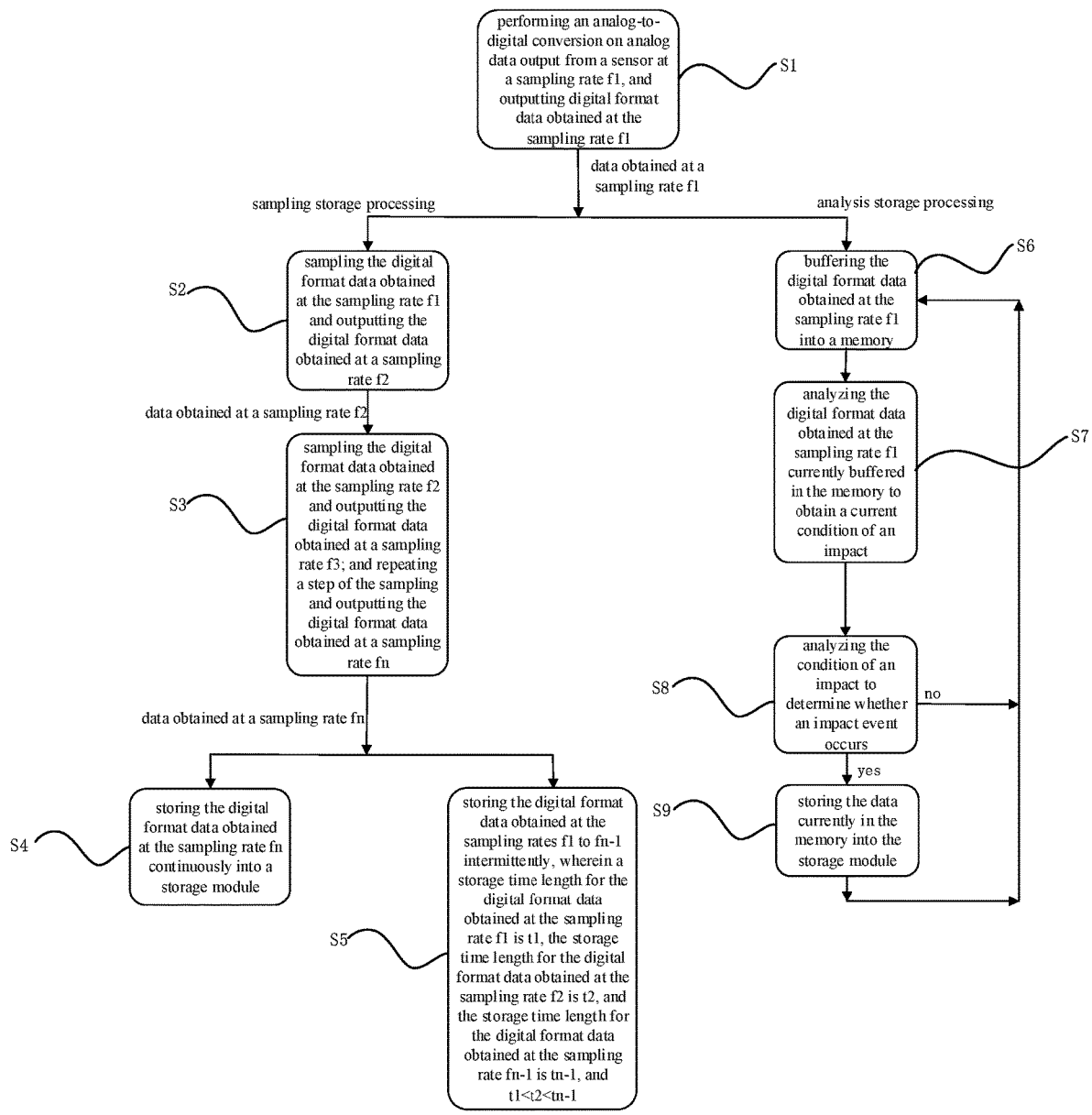
FIG. 1 is a schematic diagram of a vibration and impact data recording method according to an embodiment of the disclosure.

In order to make the objects, technical solutions and advantages of the embodiments of the disclosure more clear, the technical solutions in accordance with the embodiments of the disclosure will be clearly and fully described below in conjunction with the accompanying drawings involved in the embodiments of the disclosure. Apparently, the embodiments described are only a portion of the embodiments of the disclosure, not all of the embodiments. All other embodiments obtained by those skilled in the art without creative efforts based on the disclosed embodiments of the disclosure are within the scope of the disclosure.

In the description of the disclosure, it should be further illustrated that the terms "dispose", "couple", and "connect" should be understood in a broad sense, unless otherwise explicitly stated and defined. For example, "connect" may be a direct connection, an indirect connection through an intermediate medium, or an internal communication between two components. The specific meanings of the above terms in the present disclosure can be understood by those skilled in the art based on specific conditions.

In this disclosure, relationship terms such as first and second are used merely to distinguish an entity or operation from another entity or operation, and do not necessarily require or imply any actual relationship or sequence between these entities and operations. Furthermore, the term "comprise" or "include" or any other variants thereof is intended to cover a non-exclusive inclusion, such that a process, method, article, or device that comprises a series of elements may comprise not only those elements but also other elements not specified explicitly, or elements that are inherent to such a process, method, article, or device. An element that is defined by a phrase "comprising a . . . " does not exclude the presence of extra same elements in the process, method, article, or device that comprises said element.

An impact signal generated during a drilling process has a high frequency (up to several hundreds hertz or even 2 kHz) and a short duration. To analyze characteristics of the impact signal, according to the data sampling law, a sampling rate must be higher (at least twice the frequency of the impact signal). In contrast, a frequency of a vibration signal in the field of petroleum exploration is mostly below 100 Hz. Thus, a low sampling rate suitable for recording the vibration signal is utilized to record data, then the characteristics of the impact signal cannot be recorded. Therefore, those skilled in the art usually employ a high sampling rate to record impact and vibration signals. However, there are problems involving too high sampling rate, excessively redundant data, and difficulty for storing in the storage.

According to an embodiment of the disclosure, a downhole vibration and impact data recording method is provided, which may comprise:

step S1, performing an analog-to-digital conversion on analog data output from a sensor at a sampling rate f1, and outputting digital format data obtained at the sampling rate f1.

In an embodiment of the disclosure, in order to ensure a response rate, the analog-to-digital conversion may be performed by a high speed analog-to-digital converter (ADC). In some embodiments, the highest sampling rate of the high speed ADC may be up to 100 kSps. In some embodiments, in order to improve sampling accuracy, the high speed ADC may be a 24-bit ADC.

The sampling rate f1 may be in a frequency range of 500 Hz to 20 kHz, and in some embodiments be 10 kHz in consideration of the characteristics for the recording of vibration data of downhole drilling in the field of petroleum exploration.

After the step S1 is completed, two types of processing may be performed on the digital format data obtained at the sampling rate f1. One type of processing may be a sampling storage processing, including steps S2-S3, and the other type of processing may be an analysis storage processing, including steps S4-S7. The two types of processing may be performed in parallel at the same time without a particular order, and will be introduced respectively below.

In step S2, the digital format data obtained at the sampling rate f1 may be sampled, and the digital format data obtained at a sampling rate f2 may be output.

The digital format data obtained at the sampling rate f2 may be mainly used for analyzing the vibration characteristics of a device, in some embodiments f1>>f2. The sampling rate f2 may be in a frequency range of 500 Hz to 5 kHz. For the field of petroleum exploration, 1 kHz is more preferred. When the sampling rate is 1 kHz, the obtained digital format data can retain vibration information contained in an original analog data to the utmost extent. Compared to directly storing digital format data obtained at the sampling rate f1 contiguously, the amount of data may be greatly reduced.

In an embodiment of the disclosure, in order to remove interference from impurity signals, an anti-aliasing filtering may be performed before the digital format data obtained at the sampling rate f1 is sampled. In some embodiments, the anti-aliasing filtering may adopt a cutoff frequency of 0.5*f2 in view of data characteristics in the field of petroleum exploration. By adding a step of performing the anti-aliasing filtering with a cutoff frequency of 0.5*f2 before the digital format data obtained at the sampling rate f1 is sampled, a signal-to-noise ratio of a signal can be significantly improved.

In step S3, the digital format data obtained at the sampling rate f2 may be sampled again, and the digital format data obtained at a sampling rate f3 may be output, and optionally, a step of the sampling may be repeated, and the digital format data obtained at a sampling rate fn may be output.

In an embodiment of the disclosure, f1>f2>fn.

In an embodiment of the disclosure, an anti-aliasing filtering may be performed before each sampling, and a cutoff frequency for each anti-aliasing filtering may be 0.5*fn.

Considering the data characteristics in the field of petroleum exploration, in some embodiments n=4. Digital format data may be obtained at the sampling rates f1, f2, f3, and f4, respectively, where f1>f2>f3>f4. In some embodiments, f1, f2, f3, and f4 may be 10 kHz, 2 kHz, 512 Hz, and 64 Hz, respectively.

In step S4, the digital format data obtained at the sampling rate fn may be continuously stored into a storage module.

In an embodiment of the disclosure, the storage module may have a capacity of 1-10 TB. Considering the environmental characteristics of strong vibration, high temperature and high pressure in a drilling operation, the storage module may be a high temperature and large capacity flash memory.

In step S5, the digital format data obtained at the sampling rates f1 to fn−1 may be intermittently stored, wherein a storage time length for the digital format data obtained at the sampling rate f1 is t1, a storage time length for the digital format data obtained at the sampling rate f2 is t2, and a storage time length for the digital format data obtained at the sampling rate fn−1 is tn−1, and t1<t2<tn−1.

In an embodiment of the disclosure, in order to ensure continuity of data, operations of intermittently storing the digital format data obtained at the sampling rates f1 to fn−1 may be continuous in time. In some embodiments, the digital format data obtained at the sampling rate f1 may be first stored for time t1. After the storage of the digital format data obtained at the sampling rate f1 is completed, the digital format data obtained at the sampling rate f2 may be stored at once for time t2. The above step of storage may be repeated, until the digital format data obtained at the sampling rate fn−1 is stored for time tn−1. After the storage of the digital format data obtained at the sampling rate fn−1 is completed, it may be repeated that the digital format data obtained at the sampling rate f1 is stored for time t1 again. In this manner, the continuity of data can be ensured and the information contained in the original data can be preserved to the utmost extent.

Figure 2:
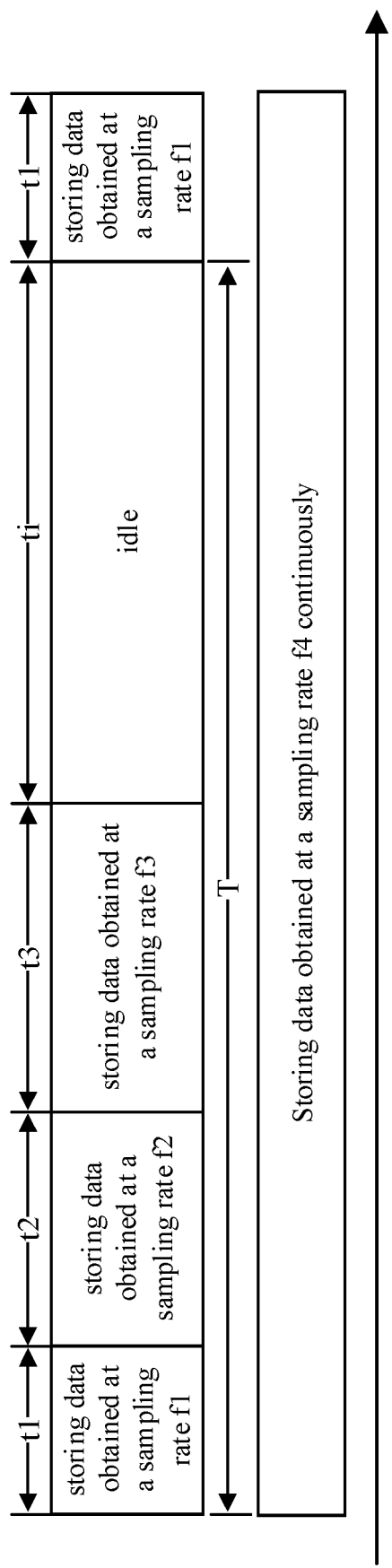
FIG. 2 is a schematic diagram showing storage times for data obtained at various sampling rates according to an embodiment of the disclosure.

In some embodiments of the disclosure, in order to further save storage space, idle time may be added while the digital format data obtained at the sampling rates f1 to fn−1 are intermittently stored. In some embodiments, the digital format data obtained at the sampling rate f1 may be first stored for time t1. After finishing the storage of the digital format data obtained at the sampling rate f1, the digital format data obtained at the sampling rate f2 is stored for time t2 at once. The above step of storage may be repeated, until the digital format data obtained at the sampling rate fn−1 is stored for time tn−1. After the storage of the digital format data obtained at the sampling rate fn−1 is completed, the operation of storage may be stopped for time ti. After the time ti is over, the digital format data obtained at the sampling rate f1 may be stored for time t1 again. In this way of storage, the storage space can be saved to the greatest extent. In an actual drilling operation, an embodiment of n=4 of the disclosure may be adopted and a mode of intermittent storage with idle time may be employed. As shown in FIG. 2, a drilling operation may last for 300 hours or more, and the amount of data may be successfully compacted to less than 1 TB, greatly reducing the requirements for storage space. For the deep formation exploration as a direction of development, the underground temperature and pressure involved in the very deep underlying-layer drilling operation are very high, the requirements for the performance of equipment are extremely high, and a drilling time is long. A vibration data recording method with a multiple sampling rates according to the present disclosure is particularly suitable for very deep underlying layer drilling operations.

At this point, the sampling storage processing for the digital format data obtained at the sampling rate f1 is completed. Next, the analysis storage processing will be described below, including steps S6-S9.

In step S6, the digital format data obtained at the sampling rate f1 may be buffered into a memory.

In an embodiment of the disclosure, the memory may buffer data for a time length tb, and a mode for buffering data is a first-in first-out mode. This can ensure that the latest data is always buffered in the memory.

In step S7, the digital format data obtained at the sampling rate f1 currently buffered in the memory may be analyzed to obtain a current condition of an impact.

In an embodiment of the disclosure, the condition of an impact may include a magnitude of an impact and a duration during which the impact occurs. In some embodiments, data analysis may be implemented in a single chip microcomputer, a MCU, a DSP or an FPGA.

In step S8, the condition of the impact may be analyzed to determine whether an impact event has occurred. If an impact event occurs, performing step S9; if no impact event occurs, returning to step S6 directly.

In step S9, the data currently in the memory may be stored into a storage module, and then returning to step S4.

In an embodiment of the disclosure, to determine whether an impact event occurs is to determine whether the magnitude of the impact is greater than a threshold A.

In an embodiment of the disclosure, in order to save the storage space, when it is detected that an impact event occurs, not all the data in the memory are stored into the storage module. Instead, a time tc is set, and the data for the time tc before and after the impact event occurs are stored into the storage module. In some embodiments, tc may be less than or equal to tb. With this mode of storage, the amount of invalid data may be further reduced.

In an embodiment of the disclosure, there is also a step S10: after the storage of the data is completed, the data may be read using a special data reading program. In some embodiments, the data reading program may be specially written for a data storage scheme, can realize the establishment of spectral characteristics of the vibration data, and restore the original data for analysis.

Compared with a format of conventional continuous storage, the downhole vibration and impact data recording method according to the embodiments of the disclosure may generate data streams at two kinds of sampling rates, and use different storage strategies for the data streams at different sampling rates, i.e., the data obtained at a relatively low sampling rate may be continuously stored, and the data obtained at a relatively high sampling rate may be first buffered, and when an impact occurs, the data for a period of time before and after the impact may be stored, so that the amount of data storage can be effectively reduced, and the characteristics of the vibration and impact data, especially the spectrum characteristics thereof, can be analyzed. While the original data information is fully retained, the requirements for the storage devices are greatly reduced. The downhole vibration and impact data recording method according to the embodiments of the disclosure is especially applicable for very deep underlying-layer drilling operations involving high underground environment temperature and pressure and requiring extremely high performance of equipment, which is in line with the demand for deep formation exploration.

While the preferred embodiments of the disclosure have been described, those skilled in the art can make various modifications and variations on the disclosed embodiments once learning the inventive concept of the disclosure. Therefore, the appended claims are intended to be interpreted as covering the preferred embodiments and all the modifications and variations falling in the scope of the disclosure.

It will be apparent that those skilled in the art can make various modifications and variations to the disclosure without departing from the spirit and scope of the disclosure. Thus, it is intended that the disclosure cover all those modifications and variations if they are within the scope of the appended claims and their equivalents.

The invention claimed is:

1. A vibration and impact data recording method for a drilling operation, comprising:

step S1, performing an analog-to-digital conversion at a sampling rate f1 on analog data output from a sensor to obtain a first digital format data and outputting the first digital format data; and performing a sampling storage processing and an analysis storage processing on the first digital format data, and wherein the sampling storage processing comprises:

step S2, sampling the first digital format data at the sampling rate f2 to obtain a second digital format data and outputting the second digital format data, wherein f1>f2;

step S3, sampling the second digital format data at the sampling rate f3 to obtain a third digital format data and outputting the third digital format data, wherein f2>f3;

and repeating a step of the sampling and outputting until a $n^{th}$ digital format is obtained at a sampling rate fn, wherein n is any integer greater than 3;

step S4, storing the $n^{th}$ digital format data continuously into a storage module, wherein the $n^{th}$ digital format data represents vibration signals;

step S5, storing the first digital format data, the second digital format data, ..., the $(n-1)^{th}$ digital format data intermittently;

and wherein the analysis storage processing comprises:

step S6, buffering the first digital format data into a memory;

step S7, analyzing the first digital format data currently buffered in the memory to obtain a current condition of an impact;

step S8, analyzing the condition of an impact to determine whether an impact event occurs; if the impact event occurs, performing step S9; if no impact event occurs, the analysis storage processing ends; and step S9, storing the data currently in the memory into the storage module.

2. The method of claim 1, further comprising step S10: reading the data using a data reading program after a data storage is completed.

3. The method of claim 1, wherein in step S1, the analog-to-digital conversion is implemented by a 24-bit high speed analog-to-digital converter.

4. The method of claim 1, wherein f1=10 KHz and f2=1 KHz.

5. The method of claim 1, further comprising a step of performing an anti-aliasing filtering on the digital format data obtained at the sampling rate f1 before sampling the digital format data having obtained at the sampling rate f1.

6. The method of claim 5, wherein the anti-aliasing filtering has a cutoff frequency of 0.5*f2.

7. The method of claim 1, wherein the condition of an impact includes a magnitude of the impact and a duration during which the impact occurs.

8. The method of claim 7, wherein to determine whether an impact event occurs is to determine whether the magnitude of the impact is greater than a threshold A.

9. The method of claim 1, wherein the data is buffered in a first-in first-out mode.

10. The method of claim 1, wherein the storage module is a high-temperature and large-capacity flash memory.

* * * * *